(12) United States Patent
Kim et al.

(10) Patent No.: US 8,903,998 B2
(45) Date of Patent: Dec. 2, 2014

(54) APPARATUS AND METHOD FOR MONITORING WEB APPLICATION TELECOMMUNICATION DATA BY USER

(71) Applicant: SOMANSA Co., Ltd., Seoul (KR)

(72) Inventors: Tae Wan Kim, Seoul (KR); Seung Tae Paek, Seoul (KR); Il Hoon Choi, Seoul (KR)

(73) Assignee: Somansa Co., Ltd, Seoul (KR)

( * ) Notice: Subject to any disclaimer, the term of this patent is extended or adjusted under 35 U.S.C. 154(b) by 181 days.

(21) Appl. No.: 13/752,509

(22) Filed: Jan. 29, 2013

(65) Prior Publication Data

US 2014/0089496 A1    Mar. 27, 2014

(30) Foreign Application Priority Data

Sep. 25, 2012    (KR) .......................... 10-2012-0106449

(51) Int. Cl.
| | | |
|---|---|---|
| *G06F 15/173* | (2006.01) | |
| *H04L 12/26* | (2006.01) | |
| *H04L 29/12* | (2006.01) | |
| *H04L 29/06* | (2006.01) | |
| *H04L 29/08* | (2006.01) | |

(52) U.S. Cl.
CPC ........... *H04L 43/04* (2013.01); *H04L 29/06884* (2013.01); *H04L 12/2607* (2013.01); *H04L 63/1408* (2013.01); *H04L 12/26* (2013.01); *H04L 12/2605* (2013.01); *H04L 29/08675* (2013.01); *H04L 29/06897* (2013.01); *H04L 67/02* (2013.01); *H04L 61/00* (2013.01); *H04L 67/28* (2013.01); *H04L 67/146* (2013.01); *H04L 67/2809* (2013.01)
USPC ....................................................... 709/224

(58) Field of Classification Search
CPC . H04L 12/26; H04L 12/2602; H04L 12/2605; H04L 12/2607; H04L 29/08675; H04L 29/06884; H04L 29/06897; H04L 63/1408; H04L 67/28; H04L 67/146; H04L 67/2809
USPC ......................................................... 709/224
See application file for complete search history.

(56) References Cited

U.S. PATENT DOCUMENTS

| | | | |
|---|---|---|---|
| 8,260,907 B2 * | 9/2012 | O'Sullivan ................... 709/224 |
| 8,392,982 B2 * | 3/2013 | Harris et al. .................... 726/12 |
| 2006/0282660 A1 * | 12/2006 | Varghese et al. ............. 713/155 |
| 2010/0278068 A1 * | 11/2010 | Nobert et al. ................. 370/253 |
| 2012/0173870 A1 * | 7/2012 | Reddy et al. .................. 713/153 |
| 2013/0160099 A1 * | 6/2013 | Fitzpatrick, III ................... 726/7 |

* cited by examiner

*Primary Examiner* — Krisna Lim
(74) *Attorney, Agent, or Firm* — Sughrue Mion, PLLC

(57) ABSTRACT

Provided are an apparatus and method for monitoring web application telecommunication data by user. An information identification apparatus includes a collector collecting web application telecommunication data transmitted and received between a web server and a web client; a storage storing an identification information profile about a method of extracting user identification information by web server; and an extractor selecting user login-related web application telecommunication data among the web application telecommunication data with reference to the identification information profile, extracting a [web server address, login session identification information, and user identification information] list from the selected web application telecommunication data, extracting at least one piece of information of the web server address and the login session identification information from the web application telecommunication data after the user login, and determining whether the extracted information is matched with at least one piece of information in the list.

5 Claims, 3 Drawing Sheets

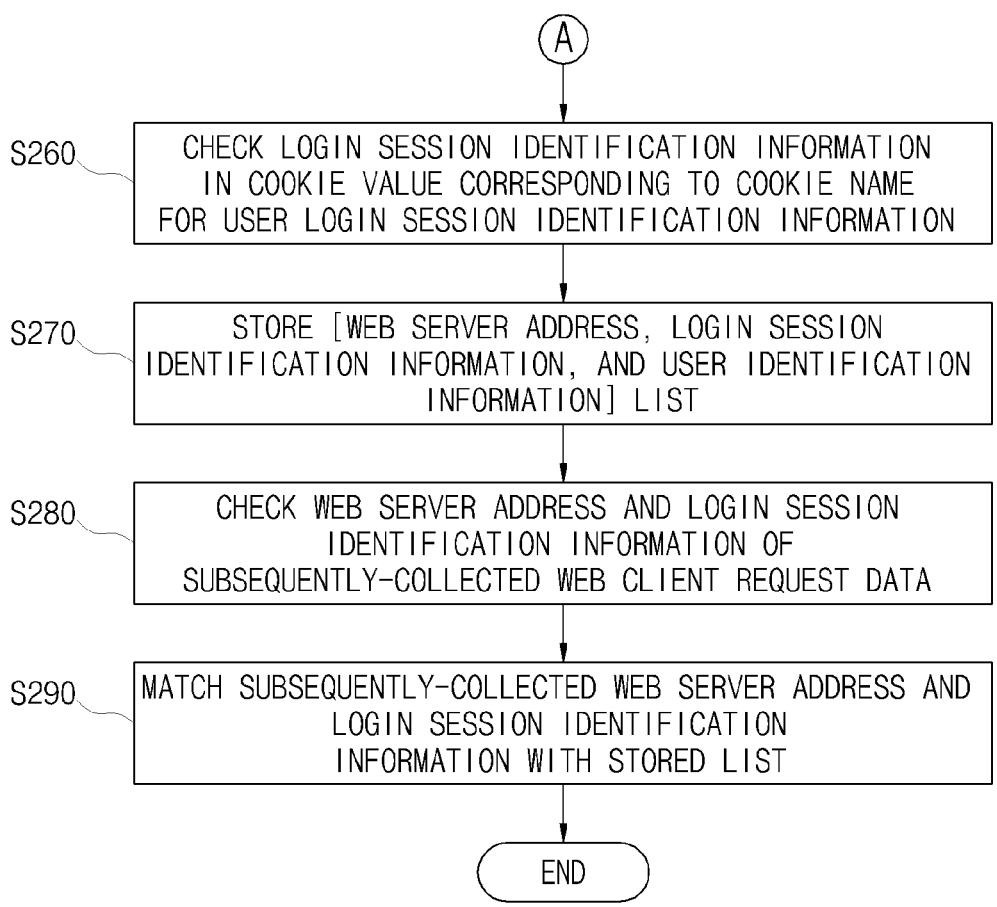

APPARATUS AND METHOD FOR MONITORING WEB APPLICATION TELECOMMUNICATION DATA BY USER

CROSS-REFERENCE TO RELATED APPLICATIONS

This application claims priority under 35 U.S.C. §119 to Korean Patent Application No. 10-2012-0106449, filed on Sep. 25, 2012, the disclosure of which is incorporated herein by reference in its entirety.

TECHNICAL FIELD

The present invention relates to a data monitoring method, and in particular, to an apparatus and method for monitoring web application telecommunication data by user, which monitor web application telecommunication data.

BACKGROUND

Recently, business systems within an organization are constructed with web applications and used for tasks. Moreover, since security accidents using the web applications occur frequently, web application telecommunication data are monitored.

A related art monitoring system performs an access control and an audit trail on web application telecommunication data by web client user on the basis of user identification information.

As an example, a related art system extracts user identification information using an Internet Protocol (IP) address of a web client. However, a plurality of web client users use the same IP address or IP addresses are dynamically changed in a network environment such as Dynamic Host Configuration Protocol (DHCP), Network Address Translation (NAT), or Virtual Private Network (VPN). Thus, it is difficult to extract user identification information from the IP address of the web client.

SUMMARY

Accordingly, the present invention provides an apparatus and method for monitoring web application telecommunication data by user, which monitor web application telecommunication data by user with an identification information profile.

In one general aspect, an information identification apparatus includes a collector collecting web application telecommunication data transmitted and received between a web server and a web client; a storage storing an identification information profile about a method of extracting user identification information by web server; and an extractor selecting user login-related web application telecommunication data among the web application telecommunication data with reference to the identification information profile, extracting a [web server address, login session identification information, and user identification information] list from the selected web application telecommunication data, extracting at least one piece of information of the web server address and the login session identification information from the web application telecommunication data after the user login, and determining whether the extracted information is matched with at least one piece of information in the list.

Other features and aspects will be apparent from the following detailed description, the drawings, and the claims.

BRIEF DESCRIPTION OF THE DRAWINGS

FIGS. 2A and 2B is a flowchart illustrating a user identification method according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
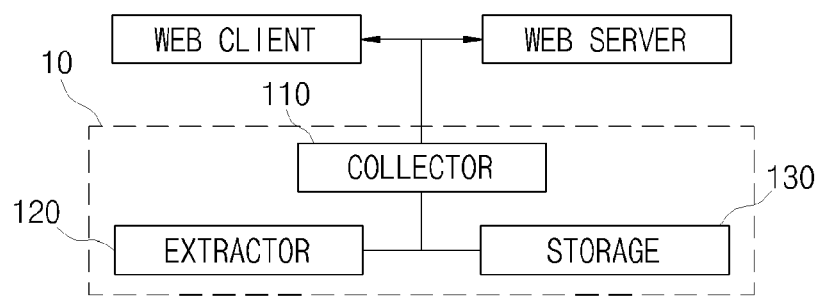
FIG. 1 is a block diagram illustrating an information identification apparatus according to an embodiment of the present invention.

FIG. 1 is a block diagram illustrating an information identification apparatus according to an embodiment of the present invention.

Referring to FIG. 1, an information identification apparatus 10 according to an embodiment of the present invention includes a collector 110, a storage 130, and an extractor 120.

The collector 110 collects web application telecommunication data that are transmitted and received between a web client and a web server and include web client request data and web server response data, in a proxy scheme, an inline scheme, or a mirroring scheme.

The storage 130 stores an identification information profile in which a method of extracting user identification information in each web server has been defined.

Here, the identification information profile includes at least one of: URL information of user login web client request data including user identification information and an address of the web server; a parameter name (parameter name for user identification information) of the user login web client request data including the user identification information; and a cookie name (cookie name for login session identification information) of web server response data corresponding to web client request data including login session identification information.

The extractor 120 analyzes the collected web application telecommunication data with reference to an identification information profile, and extracts a [web server address, login session identification information, and user identification information] list from web client request data and web server response data through the following operations ①, ②, and ③.

① Operation of Extracting User Identification Information

Specifically, the extractor 120 checks at least one of the web server address and URL information of the collected web client request data, and determines whether at least one of the checked web server address and URL information is the user login web client request data corresponding to the identification information profile.

When corresponding web client request data is the user login web client request data, the extractor 120 extracts a parameter value, corresponding to a parameter name for user identification information based on the identification information profile, as user identification information.

② Operation of Extracting Login Identification Information

The extractor 120 finds a cookie value corresponding to a cookie name for user login session identification information based on the identification information profile, in user login web server response data corresponding to the collected user login web client request data.

The extractor 120 checks the login session identification information in the cookie value, and stores the checked login session identification information together with the user identification information and web server address of the user login web client request data. That is, the extractor 120 stores the [web server address, login session identification information, and user identification information] list.

③ Operation of Matching User Identification Information

The extractor 120 checks a web server address and login session identification information that is a cookie value corresponding to a cookie name for login session identification information, in web client request data collected after the login of a user. And the extractor 120 compares the checked address and information with the stored [web server address, login session identification information, and user identification information] list to match user identification information.

At this point, when information in the stored [web server address, login session identification information, and user identification information] list is matched with the web server address and login session identification information of web client request data after the login of the user, the extractor 120 or another element (not shown) may check a user of the web client request data after the login of the user on the basis of user identification information in the list. Therefore, the extractor 120 or the other element (not shown) checks web client request data by user, and performs at least one of an audit trail and an access control.

As described above, the information identification apparatus 10 may check web application telecommunication data by user through the above-described operations, and perform an audit trail and an access control.

Hereinafter, a user identification method according to an embodiment of the present invention will be described with reference to FIG. 2A and 2B.

Figure 2A:
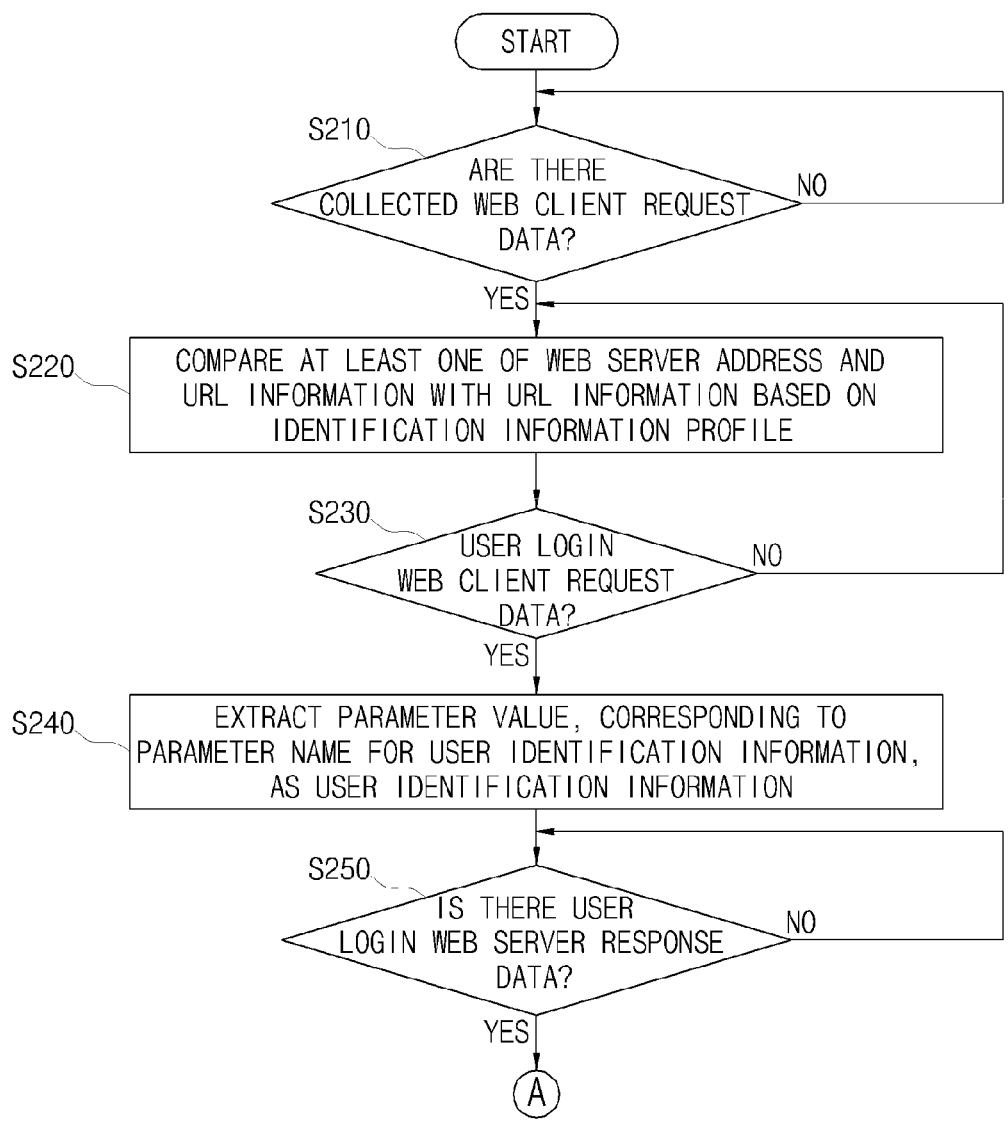

FIG. 2A and 2B is a flowchart illustrating a user identification method according to an embodiment of the present invention.

Referring to FIG. 2A and 2B, the information identification apparatus 10 determines whether web client request data is included in collected web application telecommunication data in operation S210.

The information identification apparatus 10 checks at least one of a web server address and URL information of the web client request data, and compares at least one of the checked web server address and URL information with URL information based on an identification information profile, in operation S220.

The information identification apparatus 10 determines whether the collected web client request data are the user login web client request data in operation S230. At this point, when compares the at least one of the web server address and URL information is matched with URL information the user login web client request data based on the identification information profile, the information identification apparatus 10 may determine corresponding data as the user login web client request data.

When the collected web client request data are the user login web client request data, the information identification apparatus 10 extracts a parameter value, corresponding to a parameter name for user identification information based on the identification information profile, as user identification information in operation S240.

Subsequently, the information identification apparatus 10 determines whether there are user login web server response data corresponding to the collected web client request data in operation S250.

In operation S260, the information identification apparatus 10 checks login session identification information in a cookie value corresponding to a cookie name for login session identification information based on the identification information profile, in the user login web server response data.

In operation S270, the information identification apparatus 10 stores a [web server address, login session identification information, and user identification information] list.

When web client request data after the login of the user are collected, the information identification apparatus 10 checks a web server address and a cookie value corresponding to a cookie name for login session identification information to determine login session identification information in operation S280.

In operation S290, the information identification apparatus 10 matches the web server address and login session identification information after the login of the user with the stored [web server address, login session identification information, and user identification information] list.

At this point, when information in the stored [web server address, login session identification information, and user identification information] list is matched with a web server address and login session identification information of web client request data after the login of the user, the information identification apparatus 10 checks user identification information of the web client request data. Subsequently, the information identification apparatus 10 or another element (not shown) may check corresponding web client request data by user on the basis of the user identification information of the checked web client request data, and perform an audit trail and an access control.

As described above, the present invention can extract web client user identification information from web application telecommunication data and support an access control or an audit trail for each web client user, even in a network environment (including DHCP, NAT, or VPN) or an environment in which user identification information is not included in cookie information of web client request data.

Moreover, the present invention decrypts a plain text included in cookie information of web client request data or decrypts encrypted user identification information, thereby identifying a user. Also, even when cookie information includes only login session identification information without user identification information for security reasons, it is able to extract the user identification information.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An information identification apparatus, comprising:
a collector collecting web application telecommunication data transmitted and received between a web server and a web client;
a storage storing an identification information profile about a method of extracting user identification information by web server; and
an extractor selecting user login-related web application telecommunication data among the web application telecommunication data with reference to the identification information profile, extracting a [web server address, login session identification information, and user identification information] list from the selected web application telecommunication data, extracting at least one piece of information of the web server address and the login session identification information from the web application telecommunication data after the user login, and determining whether the extracted information is matched with at least one piece of information in the list.

2. The information identification apparatus of claim 1, wherein when the extracted information is matched with the at least one piece of information in the list, the extractor or another element identifies a user of the web application telecommunication data after the user login on the basis of the user identification information based on the list.

3. The information identification apparatus of claim 1, wherein the identification information profile comprises at least one of a web server address, URL information, and parameter name of user login web client request data and a cookie name of user login web server response data corresponding to the user login web client request data, in the web application telecommunication data.

4. The information identification apparatus of claim 3, wherein,
the extractor selects web client request data from the collected web application telecommunication data, and checks whether a web server address and URL information of the web client request data are matched with at least one of the web server address and URL information of the user login web client request data to determine whether the web client request data is the user login web client request data, and
when the web client request data is the user login web client request data, the extractor extracts a parameter value, corresponding to a parameter name of the user login web client request data, as the user identification information, and extracts a cookie value, corresponding to a cookie name of user login web server response data corresponding to the user login web client request data, as the login session identification information to store the [web server address, login session identification information, and user identification information] list.

5. The information identification apparatus of claim 4, wherein,
the extractor extracts the web server address and the login session identification information from the web client request data collected after the user login, and compares the extracted web server address and login session identification information with the list, and
when the extracted web server address and login session identification information are matched with the web server address and login session identification information in the list, the extractor identifies a user of the web client request data on the basis of the user identification information in the list.

* * * * *